April 6, 1965 H. W. KNIGHT 3,176,730
APPARATUS FOR TRANSFERRING FLUID BETWEEN VESSELS
Filed June 23, 1960 5 Sheets-Sheet 1
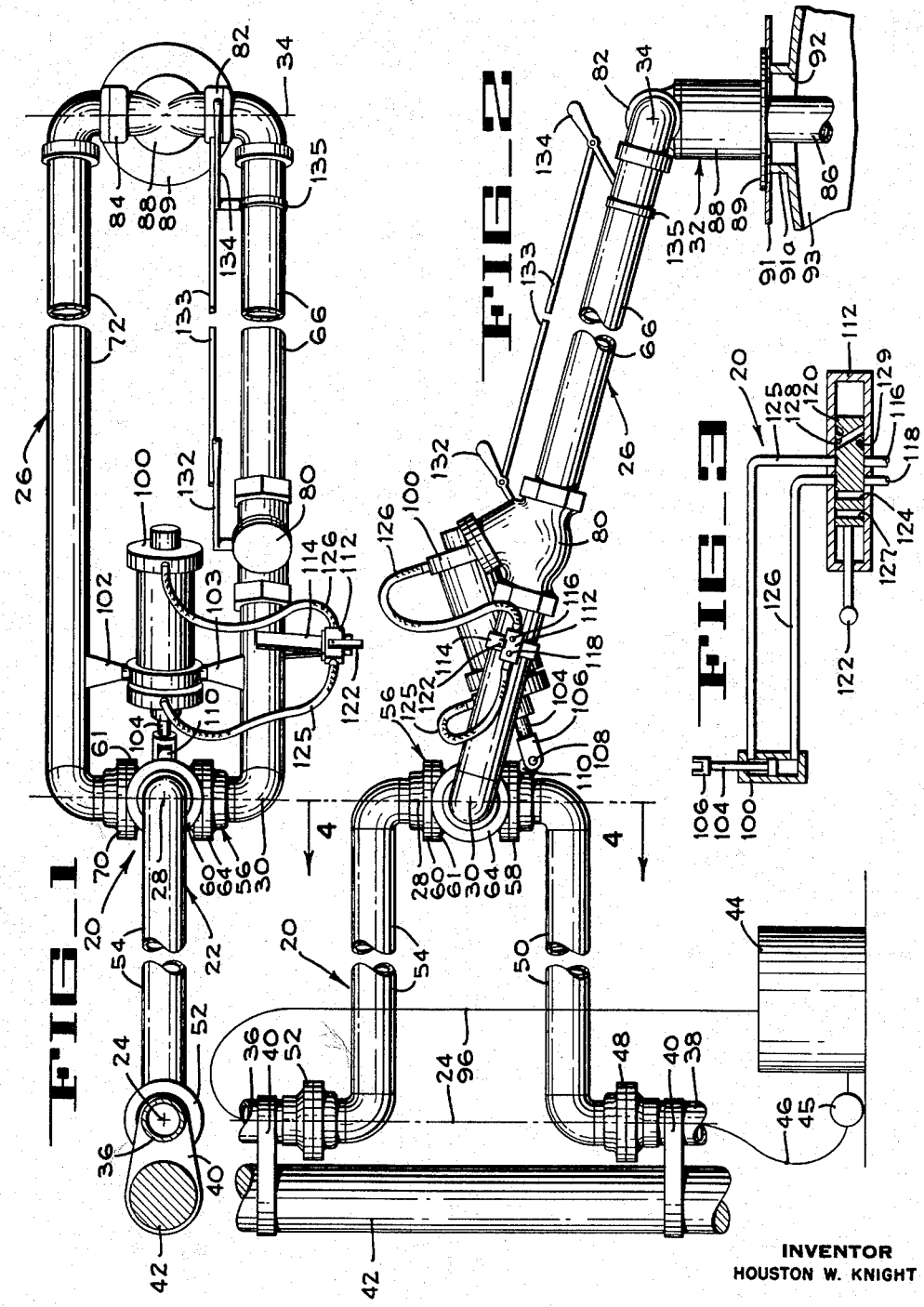
INVENTOR
HOUSTON W. KNIGHT
BY *Hans G. Hoffmeister*
ATTORNEY

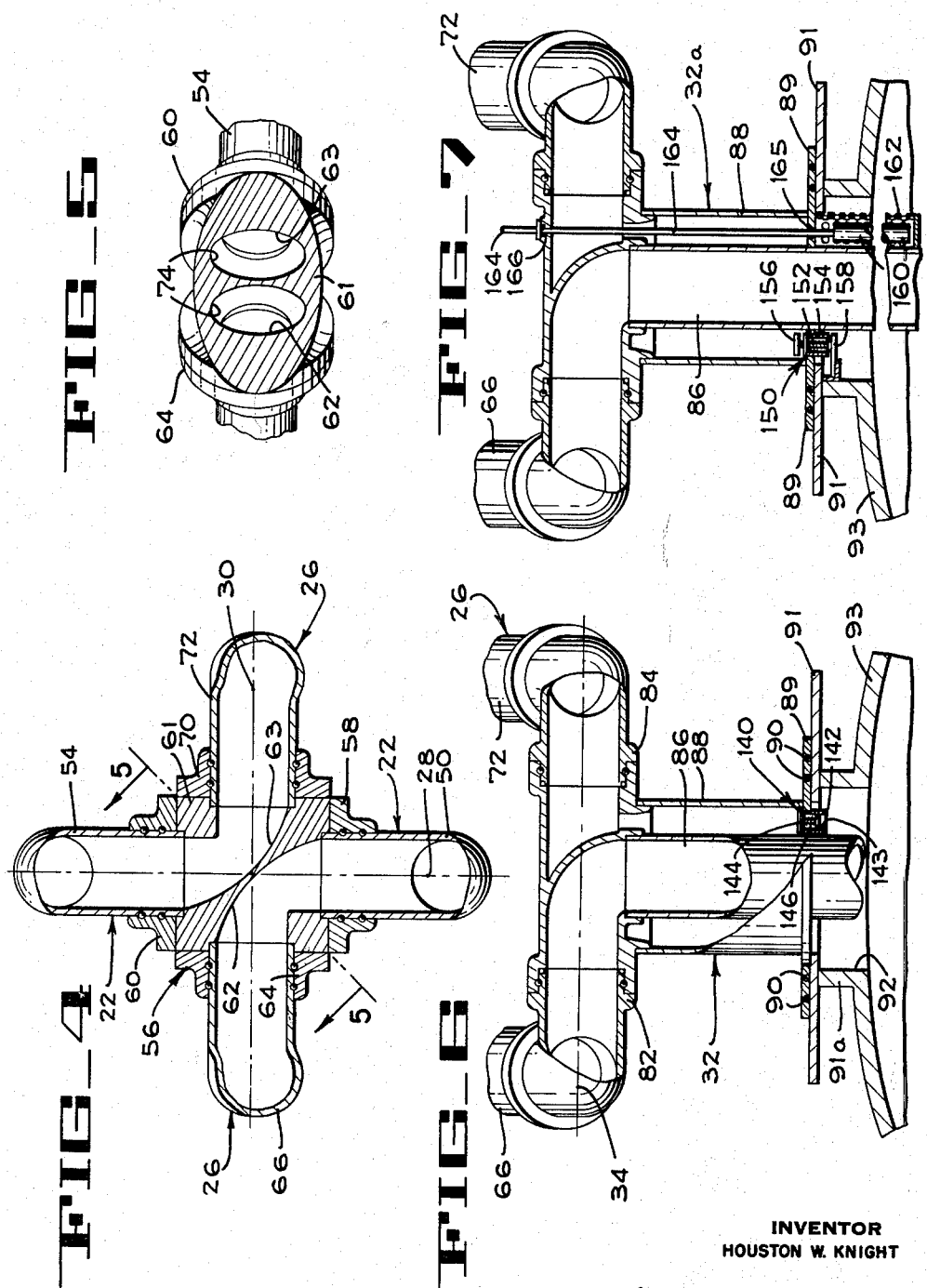

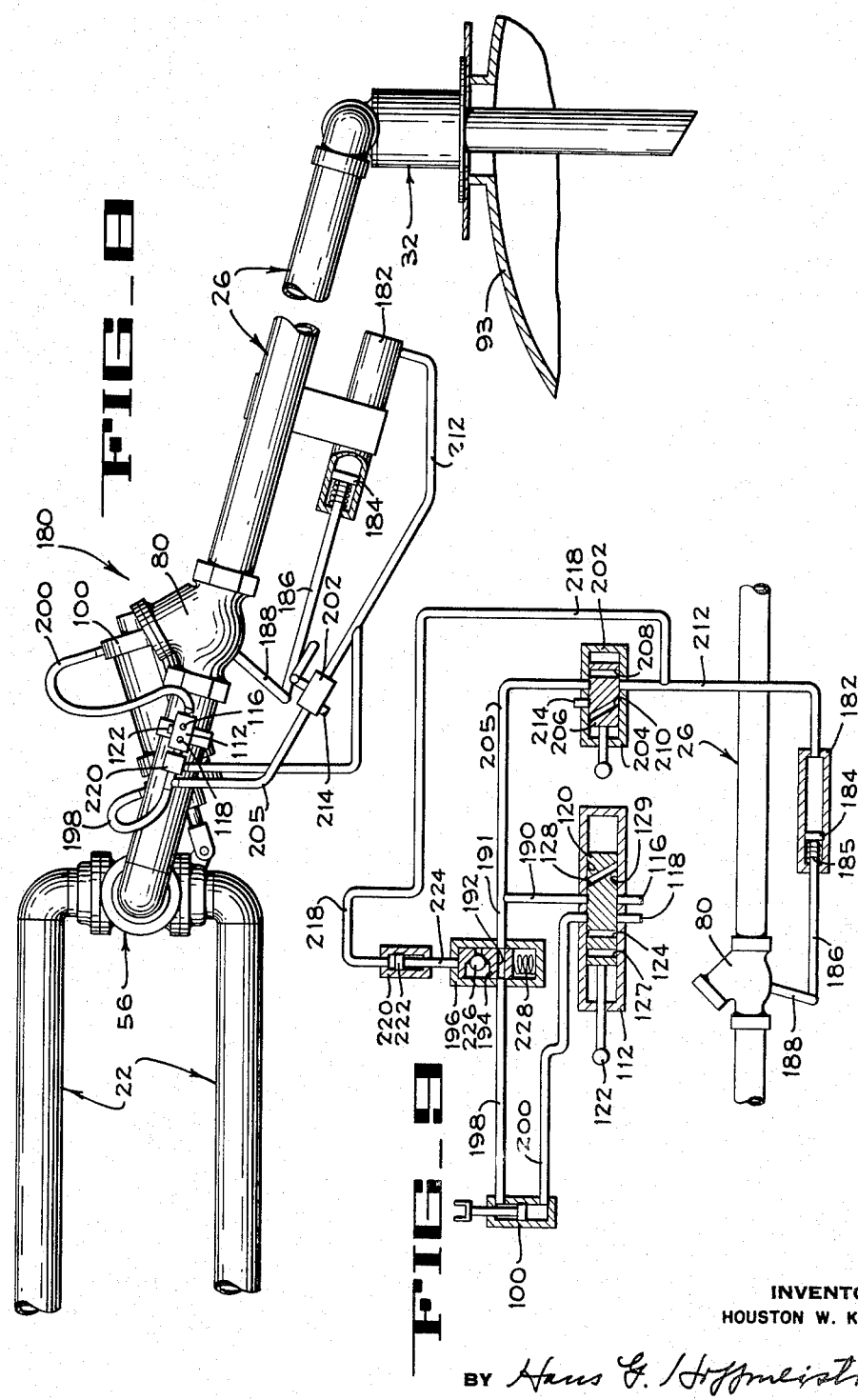

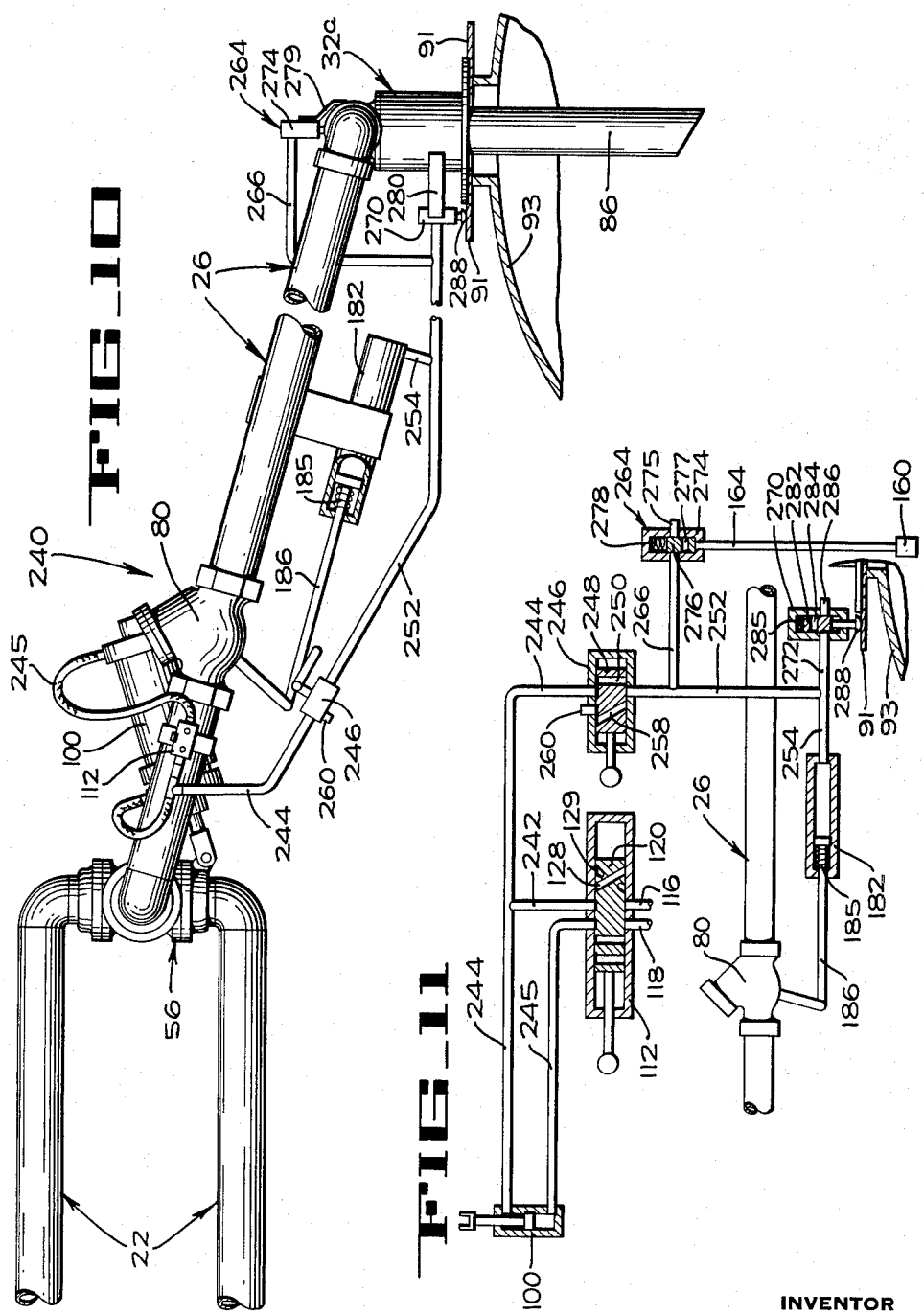

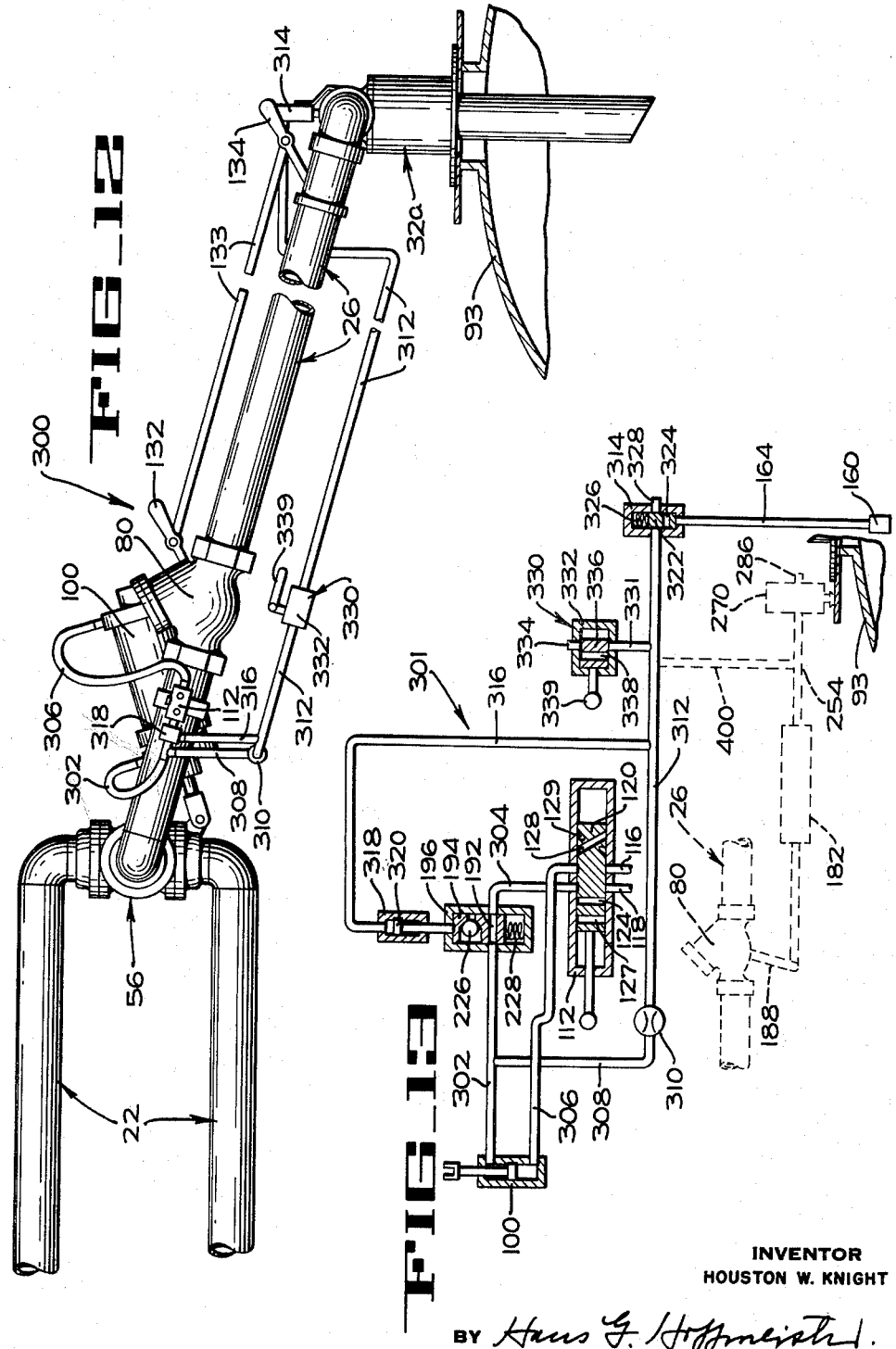

United States Patent Office 3,176,730
Patented Apr. 6, 1965

3,176,730
APPARATUS FOR TRANSFERRING FLUID
BETWEEN VESSELS
Houston W. Knight, La Mirada, Calif., assignor, by mesne assignments, to FMC Corporation, San Jose, Calif., a corporation of Delaware
Filed June 23, 1960, Ser. No. 38,163
35 Claims. (Cl. 141—290)

This invention pertains to fluid handling apparatus, and more particularly relates to apparatus for translating volatile fluids from one container into another.

The transfer of volatile fluids such as gasoline between containers is invariably accompanied by the generation of large volumes of vapor. This vapor is normally lost through dissipation into the surrounding air and the loss is not only expensive but the vapor tends to form explosive pockets and also is a contributing cause of the contaminated air condition known as "smog."

Presently used fluid handling apparatus which includes provision for recovering evolved vapor very often uses flexible tubing or rubber hose to return the evolved vapor to the container being unloaded. A vapor recovery hood is used in connection with the flexible tubing or rubber hose and this equipment is simply added on to the existing liquid loading arm to perform the vapor recovery function. An "add-on" system is not satisfactory because the hoses are exposed and are apt to be damaged during use; the hoses are too small in diameter to provide adequate conducting capacity for the large volume of evolved vapor; and the equipment often fails to achieve a satisfactory seal at the filling opening of the receiving vessel.

Another shortcoming of the "add-on" equipment is that its weight severely overloads the single swivel joint which supports the liquid loading arm. The overloaded swivel joint quickly wears out when this "add-on" vapor recovery equipment is used and, of course, replacement is expensive.

The present fluid handling apparatus can be advantageously used for loading a railway tank car or a truck tanker from a loading dock; the apparatus can also advantageously be used for filling underground storage tanks at gasoline service stations from a truck tanker, for example.

An object of the present invention is to provide improved fluid handling apparatus.

Another object of the present invention is to efficiently recover vapor emitted during the handling of volatile fluid.

Another object is to provide fluid handling and vapor recovery apparatus that has an exceptionally long reach.

Another object is to reduce the moment load on a swivel joint at a vertical pivot axis of a fluid handling system.

Another object is to seal the vapor recovery line of a fluid handling system automatically upon disengagement of the handling system from the receiving vessel.

Another object is to provide an improved vapor recovery hood for a vapor recovery system.

Another object is to provide an improved piping arrangement for apparatus which handles two fluids simultaneously.

Another object of the present invention is to provide an improved mounting arrangement for a loading arm.

Another object is to provide an improved piping arrangement which facilitates the placement of a discharge line at any selected point within a three-dimensional space.

Another object of the present invention is to reduce the head loss which results from deflecting a column of flowing liquid through an angle of approximately 90°.

Another object of the present invention is to reduce the space requirement of two 90° passageways which lie in one plane and have coaxial inlets and coaxial outlets.

These and other objects and advantages of the invention will be apparent from the following description and the accompanying drawings, in which:

FIGURE 1 is a plan of the fluid handling apparatus of the invention.

FIGURE 2 is a partly schematic side elevation of the fluid handling apparatus illustrated in FIG. 1.

FIG. 3 is a schematic illustration of the hydraulic circuit for the pneumatic cylinder of the embodiment of the invention illustrated in FIGS. 1 and 2.

FIG. 4 is a transverse section along line 4—4 of FIG. 2 illustrating the swivel joint head assembly.

FIG. 5 is a section along line 5—5 of FIG. 4.

FIG. 6 is an end elevation with parts broken away of the coupling head of the liquid delivering and vapor recovering apparatus of the invention, the unit being shown in operative engagement with a receiving vessel.

FIG. 7 is a view similar to FIG. 6 showing a modified form of coupling head.

FIG. 8 is a side elevation of a modified form of the fluid handling apparatus of the invention.

FIG. 9 is a schematic illustration of the hydraulic circuit for the apparatus of FIG. 8.

FIG. 10 is a side elevation of another modified form of the invention.

FIG. 11 is a schematic illustration of the hydraulic circuit for the apparatus of FIG. 10.

FIG. 12 is a side elevation of another modified form of the invention.

FIG. 13 is a schematic illustration of the hydraulic circuit for the apparatus of FIG. 12 and showing in broken lines how a part of the modified form of FIG. 10 can advantageously be incorporated with the form of the invention shown in FIG. 12.

The embodiment 20 of the invention illustrated in FIGS. 1–3 comprises an inboard boom section 22 that is mounted for movement in a horizontal plane about a substantially vertical axis 24 and an outboard boom section 26 that is mounted for universal movement with respect to the inboard section and about vertical and horizontal axes 28 and 30, respectively. The apparatus 20 includes a coupling head 32 which is mounted on the outer end of the outboard end of the outboard boom section 26 for pivotal movement relative thereto about a substantially horizontal axis 34. The apparatus 20 includes a riser pipe 36 and a riser pipe 38 whose common axis coincides with the vertical axis 24 and both of which are connected by any suitable means such as clamps 40 to an upright mounting post or equivalent rigid mounting member 42. It will be apparent that the rigid mounting member 42 could be a part of a loading dock or a truck tanker.

The volatile product to be loaded arrives in the apparatus 20 through the pipe 38 from a source vessel 44. The source vessel 44 is conneced through a pump 45 and a liquid supply line 46 to the riser pipe 38. Connected to the upper end of the riser pipe 38 is a swivel joint 48 which is in turn connected to a horizontal tube 50. The lower end of the upper riser pipe 36 is similarly connected to a swivel joint 52 which in turn is connected to a horizontal tube 54.

The horizontal tubes 50 and 54 are spaced apart and extend laterally from the axis 24. The tubes 50 and 54 comprise the inboard boom section 22 and both are connected to a swivel joint head assembly 56 (FIGS. 1, 2, and 4). The tubes 50 and 54 are connected, respectively, to a lower swivel joint 58 and an upper swivel joint 60 that are aligned coaxially with the vertical axis 28, and support a block 61 (FIGS. 4 and 5) having two 90° curved passageways 62 and 63 therethrough. Fluid arriving through the lower tube 50 flows through the swivel joint 58 into the passageway 62 and thence through another swivel joint 64 into a tube 66 of the outboard boom section 26. The upper tube 54 communicates through the swivel joint 60 with the 90° passageway 63 which is in turn connected through a swivel joint 70 to another tube 72 of the outboard boom section 26. As best shown in FIGURE 4, the swivel joints 58 and 60 are coaxial with the vertical axis 28 and therefore permit horizontal rotation of tubes 66 and 72 relative to the inner boom section 22. Similarly, swivel joints 64 and 70 are coaxial with horizontal axis 30 and consequently, permit the free vertical rotation of tubes 66 and 72 relative to the inner boom section 22.

Midway between their ends, the passageways 62 and 63 of the block 61 of the swivel joint head assembly 56 have a cross-sectional shape which streamlines fluid flow therethrough. The cross-sectional shape 74, as seen in FIG. 5, is substantially elliptical; the minor axis of the ellipse lying substantially along a radius of curvature of the associated passageway. With this configuration, the fluid flowing adjacent this inner corner or wall of the passageway moves at more nearly the same velocity as the fluid moving adjacent the curved outer wall. With conventional circular cross-section elbows, a substantial portion of the fluid moving adjacent the inner wall of the passageway must decelerate appreciably while the fluid moving adjacent the curved outer wall accelerates. This deceleration of one portion of the fluid and acceleration of another portion of the fluid in a conventional elbow causes a substantial head loss or energy loss. With flow passageways 62 and 63 having the elliptical cross-sectional shape 74 as shown in FIGURE 5, there is a great deal less acceleration and deceleration of one portion of the fluid with respect to another and therefore a great deal less head loss is experienced.

Product entering the liquid delivery tube 66 of the outboard boom section 26 flows through a product valve 80 and continues into a swivel joint 82 coaxial with the horizontal axis 34. The vapor return pipe 72 is parallel to the pipe 66 and is connected to a swivel joint 84 which is also coaxial with axis 34. The liquid product flows through the swivel joint 82 and is discharged through a drop pipe 86 (FIG. 6) which constitutes a part of the coupling head 32 (FIG. 6). The coupling head 32 also includes a vapor recovery hood 88 which surrounds the drop pipe 86. The hood 88 includes a flange 89 which is welded to the drop pipe 86 and which seals by means of seal rings 90 against the surface of a coupling flange 91 at the upper end of a suitable conduit 91a whose lower end communicates with the access opening 92 of a suitable receiving vessel 93 (FIGS. 2 and 4), such as a railway tank car, a truck tanker, or an underground storage tank. Vapor forced from the tank 93 as the tank is filled flows upward through the conduit 91a into the recovery hood 88 and continues through tube 72, through passageway 63 (FIG. 4) in the swivel joint head assembly 56, through the vertical riser 36 (FIGS. 1 and 2) and into a vapor recovery line 96 (FIG. 2) which is connected with the head space above the fluid in the source vessel 44 (FIG. 2).

Vertical movement of the outboard boom section 26 is controlled by a pneumatic cylinder 100 (FIGS. 1 and 2). The pneumatic cylinder 100 is pivotally mounted on a pair of mounting brackets 102 and 103 between the tubes 66 and 72 (FIG. 1). The piston rod 104 of the pneumatic cylinder 100 is connected by means of a clevis 106 and clevis pin 108 to a projection 110 which is integral with the block member 61 of the swivel joint head assembly 56. Air under suitable pressure is supplied to the pneumatic cylinder 100 through a manually operated control valve 112 (FIGS. 1, 2, and 3). The valve 112 is rigidly attached to the tube 66 by a welded bracket 114. The valve is served by an air supply line 116 and an exhaust line 118 which is open to atmosphere. The control valve 112 includes a sliding core 120 that is connected to a handle 122 by which the core 120 is moved longitudinally within the body of the valve 112 to any selected one of three positions. In FIG. 3 the plug 120 is shown positioned to block the flow from the supply 116 to the cylinder 100 and from the cylinder 100 to the exhaust line 118. The core 120 can be slid so that air flows through a passageway 124 therein into a flexible line 125 and thence into one end of the cylinder 100 to force the piston and attached rod 104 inward of the cylinder. Exhaust air flows from the cylinder 100 through a flexible line 126, through another core passageway 127 and out the exhaust line 118. Such movement of the piston rod 104 inward of the pneumatic cylinder 100 causes the outboard boom section 26 to pivot downward around the axis 30. Conversely, when the core is slid in the opposite direction, crossed passageways 128 and 129 in the core 120 connect the air supply line 116 with the line 126 and connect the line 125 with the exhaust line 118, thus the piston rod 104 will be forced outward of the pneumatic cylinder 100 and cause the boom section 26 to pivot upward.

When the operator has positioned the drop pipe 86 over the access opening 92 of the receiving vessel 93, he manipulates the control valve 112 so that the pneumatic cylinder slowly moves the outboard boom section 26 downward, placing the drop pipe 86 in the tank 93 and sealing the vapor recovery flange 89 against the tank flange 91. With the drop pipe in this position, the operator opens the product flow valve 80 and the product flows from the source 44 through the pump, through the product supply tubes and out the drop pipe 86 into the receiving vessel 92.

The valve 80 is opened and closed manually by a handle 132 (FIGS. 1 and 2). The handle 132 is connected to rotate the stem of the closure member in the valve 80 and is connected by a pivoted link 133 to a second valve operating handle 134 which is pivotally connected to the distal end of tube 66 by a bracket 135. It will be apparent that the valve 80 can be controlled by either handle 132 or handle 134.

Volatile fluid such as gasoline entering the tank 93 through the drop pipe 86 displaces a volume of vapor which is equal to the volume of fluid placed in the vessel 93, and additional vapor is generated as a result of the violent agitation of the liquid occurring during the loading operation. This vapor would normally escape but with the apparatus of the present invention, it is collected in the vapor hood 88 (FIG. 6) and returned to the tank 44 through the vapor recovery tubes 72 and 54.

All vapor from the tank or vessel 93 must enter the vapor hood 88 through a poppet valve 140 (FIG. 6). The poppet valve includes a cylindrical member 142 which has a longitudinal passage 143 therethrough. The upper end of the passage 143 is yieldably closed by a valve member 144 which is urged by a spring 146 to seal against the upper end of the cylindrical member 142. The spring 146 is relatively weak and therefore vapor pressure within the receiving vessel 93 in the range of 2 to 5 p.s.i.g. causes the valve member 144 to rise, permitting vapor to flow through the poppet valve into the hood 88 and through the tube 72 to the storage tank 44.

The modification 180 of the fluid handling apparatus of the present invention shown in FIG. 8 includes control which requires that delivery of liquid to the receiving vessel be stopped before the apparatus can be removed from the receiving vessel. The apparatus 180 comprises an inboard boom section 22, a swivel joint head assembly 56, an outboard boom section 26 and a coupling head 32, all of which are similar to the respectively corresponding parts of the apparatus of FIGS. 1–6. The outboard boom section 26 is provided with a product flow valve 80 and a pneumatic cylinder 100, all as previously described. However, the modification of the invention shown in FIGURE 8 is characterized by the provision of a pneumatic cylinder 182 having a piston 184 and a piston rod 186 pivotally connected to the operating lever 188 of the product valve 80.

Pneumatic controls illustrated schematically in FIG. 9 are provided which require the valve 80 be closed before the coupling head 32 can be disconnected from the receiving vessel 93. The pneumatic cylinder 100 controls up and down movement of the outboard boom section 26 by means of a control valve 112 having a control handle 122, and a sliding core 120, all as previously described. To lower the outboard boom section 26 the core 120 is moved toward the right as seen in FIG. 9 so that the passages 124 and 127 are aligned with the air supply line 116 and the vent line 118, respectively. Air then flows through the passage 124 into a line 190, through a line 191, through a port 192 in a slidable core 194 in a check valve control device 196, and into a flexible line 198 which leads to the piston-rod end of the pneumatic cylinder 100. Air is exhausted from the pneumatic cylinder 100 through a flexible exhaust line 200 which is vented to atmosphere through the core passage 127 and the exhaust line 118.

When the operator has positioned the outboard boom section 26 by manipulation of the control valve 112, he then proceeds to open the product flow valve 80 by actuating a manually operable air control valve 202, (FIGS. 8 and 9). The valve 202 comprises a housing 204 connected through a line 205 to the air lines 190 and 191. The housing 204 contains a slidable core 206 having a transverse passageway 208 and a diagonal passageway 210 therethrough. The passageway 208 is adapted to be aligned with the supply line 205 and an outlet line 212 when the core 206 is moved to the left as viewed in FIG. 9. The diagonal passageway 210 is adapted to be aligned with the line 212 and an atmospheric vent port 214. The diagonal passageway 210 thus vents the line 212 to atmosphere through the port 214 when the core 206 is moved to the right as viewed in FIG. 9. The line 212 is connected to the valve operating cylinder 182 and pressurized air supplied to the cylinder 182 from the line 212 actuates the piston 184 in the cylinder 182, opening the product valve 80 and compressing a spring 185 within the cylinder 182.

Pressurized air in the line 212 is also conducted through a line 218 to the interior of a pneumatic control cylinder 220. The pneumatic control cylinder 220 contains a piston 222 having a rod 224 that is rigid with the slidable core 194 in the check valve 196. Pressurized air in the cylinder 220 actuates the piston 222 to move the core 194 within the housing of the check valve control device 196 and thereby align a ball check device 226 with the lines 198 and 191. Such movement of the core 194 causes compression of a spring 228 contained in the housing of the check valve control device 196.

When the ball check device 226 is not in alignment with the air lines 191 and the pneumatic cylinder 100 can be powered to raise the outboard boom section 26 to withdraw the coupling head 32 from the receiving vessel 93 by moving the crossed passages 128 and 129 in the core 120 of the control valve 112 into alignment with the supply and exhaust lines 116 and 118, respectively. With the core 120 in this position, air moves through the passageway 128 and into the line 200 and exhaust air flows from the cylinder 100 through line 198, through line 190 and out the exhaust line 118.

However, when the ball check device 226 is in alignment with the lines 191 and 198, it prevents discharge of air through the line 198. Therefore, the single act of shifting the core 120 in the control valve 112 does not cause the pneumatic cylinder 100 to disengage the coupling head 32 from the receiving vessel. Air remains trapped in the cylinder 100 preventing upward movement of the outboard boom section 26, and until the control cylinder 220 is vented to atmosphere and the spring 228 returns the slidable core 194 to its normal position within the housing of the check valve 196. Such venting of the control cylinder 220 is accomplished by moving the core 206 of the control valve 202 so as to bring the diagonal passageway 210 into alignment with the line 212 and the atmospheric vent 214. The lines 212 and 218 are thus vented to atmosphere through the port 214. Release of pressure in the line 212 permits the spring 185 within the pneumatic cylinder 182 to return the piston 184 to its normal position, and this movement of the piston 184 causes the control lever 188 of the product valve 80 to close the valve 80. Venting of air from the line 218 through the port 214 also permits the spring 228 to shift the passageway 192 into alignment with the pipe 198 leading from the pneumatic cylinder 100, thus permitting air to escape through the line 198, the passageway 192, the lines 191 and 190; and if the core 120 of the control valve 112 is in its farthest position to the left as viewed in FIG. 9, the exhaust air from the boom moving cylinder escapes through the passageway 129 and out the exhaust line 118, thus permitting the cylinder 100 to raise the outer boom section 26.

It will be apparent from the foregoing description that an operator who is loading volatile fluids into a receptacle 93 cannot retract the coupling head 32 from its product loading and vapor recovering engagement with the receptacle without first shutting off the flow of product through the loading apparatus 180.

The modification 240 of the invention shown in FIG. 10 is provided with a control for automatically shutting off the flow of liquid to the receiving vessel upon retraction of the apparatus from engagement with the vessel, and with a further control for shutting off the flow of liquid when the receiving vessel is filled to a desired extent. This form 240 of the invention comprises an inboard boom section 22, a swivel joint assembly 56, an outboard boom section 26, a product control valve 80, a pneumatic boom operating cylinder 100, a control valve 112 therefor, and a control cylinder 182 for the product valve 80, similar to the respectively corresponding parts of the modifications of the invention shown in FIGS. 1 and 8, respectively. The distinguishing feature of the modification of FIG. 10 is its incorporation of the modified form of coupling head 32a shown in FIG. 7, and the different arrangement of its control apparatus which is illustrated schematically in FIG. 11. This control apparatus includes the boom operating cylinder 100 mentioned immediately above, and the control valve 112 therefor.

This modification 240 of the fluid handling apparatus of the invention employs a slightly modified coupling head 32a, illustrated in FIG. 7. The coupling head 32a includes a valve 150 which opens automatically upon placement of the vapor hood flange 89 in contact with the tank flange 91 rather than depending upon a pressure differential between the interior and the exterior of the vessel 93 to release vapor to the collecting hood 88. The contact operated valve 150 (FIG. 7) comprises a spring loaded plunger 152 within a tubular housing 154. The spring loaded plunger includes a head 156 which is adapted to close the opening into the vapor hood when the head 156 seats against the upper end of the longitudinal passage through the housing 154. Upon placement of the flange 89 in contact with the flange 91 a projection 158 welded to the sidewall of the neck of the vessel 93 contacts and moves the spring loaded plunger 152 upward moving the head 156 upward off its seat. This movement is not controlled by pressure but occurs positively when the vapor hood is placed on the tank. Therefore, the valve 150 is open and operable to conduct vapor whenever the coupling head 32a is seated on a tank flange 91 and regardless of whether or not a pressure difference exists between the vessel 93 and the interior of the vapor hood 88.

Both the poppet valve 140 and the contact operated valve 150 are closed by their respective springs when the unit 32 or 32a, respectively, is moved out of engagement with the neck flange 91 of the vessel 93.

A float 160 is reciprocable within a perforated cage 162 secured to the outside surface of the drop pipe 86. The level of the float 160 with respect to the upper end of the vessel 93 can be predetermined so that a rising liquid level in the vessel will cause the float 160 to move upward in its cage 162 and thus effect closing of the product valve 80 when the vessel is filled to a predetermined level. Attached to the float 160 is a rod 164 which extends upward through the coupling head 32a and is sealed thereto by means of O-rings 165 and 166. The O-rings prevent escape of vapor but do not impede movement of the rod 164. The coupling head 32a is lowered into engagement with the receiving vessel 93 by admitting air from the supply line 116 into a line 242 which connects into a line 244 that leads to the boom actuating cylinder 100. Air is exhausted from the cylinder through a line 245 which leads to the control valve 112. The line 244 is also connected to a control valve 246 having a slidable core 248 therein. Alignment of the passage 250 in the core 248 with the line 244 permits pressurized air to move through the core 248 into a supply line 252 which connects to a line 254 leading into the control cylinder 182 for the product valve 80. When the receiving vessel 93 has been filled and it is desired to close the product valve 80, the core 248 in the valve 246 is moved to connect the air line 252 to an atmospheric vent 260 in the side wall of the valve 246 by means of a diagonal passage 258 in the core 248. This permits the lines 254 and 252 leading from the control cylinder 182 to discharge to atmosphere so that spring 185 within the control cylinder 182 can shift the piston and rod 186 and thereby close the product valve 80.

It will be apparent that the crossed passageways 128 and 129 in the plug 120 can be shifted into alignment with the supply and exhaust lines 116 and 118, respectively (FIG. 11) and in this position the pneumatic cylinder 100 will operate to raise the coupling head 32a out of engagement with the vessel 93. Means are provided, however, to prevent raising the coupling head 32a if the product valve 80 is open. Toward this end an automatic vent unit 264 is connected by a line 266 to the line 252; and an automatic vent unit 270 is connected by a line 272 to the line 254.

The automatic venting unit 264 consists of a housing 274 having a vent opening 275 in the side wall thereof. A sliding core 276 having a passageway 277 laterally thereacross is provided within the housing. The core 276 is urged by a spring 278 to move downward within the housing 274 to close the vent opening 275. The housing 274 is secured to the coupling head 32a (FIG. 10) by a welded strap 279. The core 276 is moved within the housing 274 to align the vent opening 275, the passageway 277, and the line 266 by the hereinbefore mentioned float mechanism 160 (FIG. 7) having the vertically extended control rod 164. The float mechanism is disposed within the vessel 93 in position to float on the liquid within the vessel and thus to raise the valve core 276 to exhaust port opening position. The automatic venting device 264 thus vents lines 266, 252, and 254 leading to the control cylinder 182 so that the product valve 80 is automatically closed as the liquid level in the tank or vessel 93 rises to a predetermined level.

The automatic venting device 270 (FIGS. 10 and 11) likewise is carried by the coupling head 32a to which it is rigidly connected by a welded strap 280; the unit 270 has an interior construction similar to the automatic venting device 264, previously described. The venting device 270 includes a spring-loaded core 282 having a transverse passageway 284 that is shifted by a spring 285 into alignment with the line 272 and an atmospheric vent 286. A button-headed plunger 288 extends downward from the automatic venting device 270 and contacts the flange 91 of the vessel 93 when the coupling head 32a is lowered into the sealed position against the flange 91. In this position, the plunger 288 shifts the core 282 so that the vent opening 286 is closed. Raising of the outboard boom section 26 and attached coupling head 32a permits the spring 285 to shift the core 282 downward within the device 270 causing the passageway 284 to align with the line 272 and the vent opening 286 and thus relieve the pressure in line 254 and within the control cylinder 182. This permits the spring 185 to move the piston rod 186 causing the product valve 80 to be closed.

It will be apparent from the foregoing description that the receiving vessel 93 cannot be overfilled because the float operated venting device 264 automatically closes the valve 80 before the vessel 93 is filled to capacity. It is likewise apparent that the drop pipe 86 cannot be raised from the vessel 93 when the valve 80 is open because the automatic device 270 closes the valve 80 when the plunger 288 is moved upward out of contact with the flange 91. Therefore the safety devices 264 and 270 prevent overfilling and prevent the loading apparatus 240 from being disconnected from the vessel 93 while product is flowing through the apparatus 240.

The modification 300 (FIG. 12) of the fluid handling apparatus of the present invention comprises a previously described inboard boom section 22, an outboard boom section 26, a discharge-recovery unit 32a, a swivel head assembly 56, a pneumatic cylinder 100 for operating the outboard boom section 26, and a control valve 80. The control valve 80 (FIG. 12) is manually operated by either one of the previously described pair of handles 132 and 134 which have a linking bar 133 extending therebetween and pivotally connected to both. This modification illustrated in FIG. 12 is characterized by the provision of a control system 301 which automatically retains the fluid delivering and vapor recovering mechanism 300 in operative relation with the receiving vessel 93 until the liquid level in the vessel 93 has reached a predetermined height. FIGURE 13 diagrammatically shows the pneumatic control circuitry for actuating this locking control system 301.

One end of the pneumatic cylinder 100 is connected through an air supply line 302, through a passageway 192 in the core 194 of the check valve unit 196, previously described, and through a line 304 to the body of the control valve 112, likewise previously described. A line 306 leads from the other end of the boom cylinder 100 to the control valve 112. It will be apparent that the outboard boom section 26 is lowered by sliding the core 120 leftward as viewed in FIG. 13 so that the crossed passageways 128 and 129 are brought into registry with the supply and exhaust air lines 116 and 118, respectively. Air under pressure is conducted from the supply line 116 through the passageway 128, through the line 304 the passageway 192 of the check valve unit 196, and the line 302, into the boom cylinder 100. Air thus supplied to the line 302 likewise is conducted by a line 308, a flow-restricting orifice 310, and a line 312 to an automatic venting device 314 (FIGS. 12 and 13). The line 312 is connected by a lateral line 316 to a control cylinder 318 (FIG. 13), so that so long as pressure is maintained in the lines 302 the piston 320 in the control cylinder 318 holds the core 194 in the check valve unit 196 against the urging of its spring 228, and the ball check 226 in the plug 194 in alignment with the lines 302 and 304. The ball check 226 thus prevents exhausting of air from the cylinder 100 through the line 302, the line 304, the passageway 127, and the exhaust line 118.

When the operator desires the outboard boom section to be automatically raised upon completion of the filling of the receiving vessel 93, he first adjusts the core 120 in the control valve 112 so that the passageways 124 and 127 therein are aligned with the supply and exhaust air lines 116 and 118, respectively. With this adjustment, the supply air line 116 is in flow communication with the line 306 leading to the cylinder 100 but the cylinder's exhaust line 302 is blocked by the check ball 226 in the check valve 196. The automatic venting device 314 when operated, will exhaust the air from line 302 and cause the operation of the pneumatic cylinder 100 and thus effect raising of the outboard boom section 26.

The automatic venting device 314 is operated by the previously described float mechanism 160 which is disposed within the receiving vessel 93 and whose operating rod 164 extends upward into contact with the slidable core 322 in the automatic venting device 314. The core 322 includes a transverse passageway 324 and a spring 326 urges the passageway 324 out of registry with the line 312 and with an exhaust port 328 in the body of the device 314.

When the liquid level in the tank causes the float 160 to rise, the control rod 164 will shift the passageway 324 in the core 322 into alignment with the vent port 328 thus exhausting the air through the line 312, through the orifice 310, the line 308 and the line 302 leading from the boom cylinder 100. Pressurized air in line 306 will then cause the immediate raising of the outboard boom section 26.

A manually controlled venting device 330 connected to the line 312 by a line 331, comprises a body 332 having a venting port 334 therein. A core 336 slidable within the body is adapted to be shifted manually to bring its transverse passageway 338 into registry with the venting port 334 by moving the handle 339 connected to the core 336.

The above-described mechanism 301 for locking the fluid delivering and vapor recovering mechanism 300 in operative relation with a receiving vessel 93 can be advantageously used with any one of various fluid handling mechanisms. For example, FIG. 13 illustrates in broken lines how the locking mechanism 301 can advantageously be incorporated with the apparatus 240 of FIG. 10. The apparatus 240 includes an inboard boom section 22, an outboard boom section 26, a pneumatic boom cylinder 100, a product flow valve 80, and a pneumatic control cylinder 182 which operates the valve 80 as previously described.

In order to incorporate the locking mechanism 301 with the fluid loading and vapor recovery mechanism 240, an air line 400 (FIG. 13) is used to establish communication between the above-mentioned line 312 of the locking mechanism with the line 254 (FIGS. 11 and 13) that interconnects the operating cylinder 182 of the product valve 80 to the automatic venting unit 270 (FIGS. 11 and 13), so that the locking mechanism 301 can automatically close the product valve 80 when the vessel 93 is filled to the desired extent, and as the outboard boom section 26 and the coupling head 32a thereon begin to rise.

As above pointed out, the venting device 270 has a vent port 286 which vents the line 254 to atmosphere upon raising the device 270 out of contact with the flange 91 on the receiving vessel 93. When the line 254 is vented to atmosphere the pneumatic control cylinder 182 which is connected to the operating lever 183 of the product flow valve 80, is automatically operated by its spring and the valve 80 is automatically closed as already explained in connection with the same structure in FIG. 11.

It will be apparent, therefore, that the pneumatic control system of FIG. 13 which includes the automatic venting device 270 automatically raises the coupling head 32a from the receiving vessel 93 when the liquid level in the vessel reaches a predetermined height and concurrently therewith, the automatic venting device 270 relieves the pressure in the pneumatic cylinder 182 and causes the valve 80 to close as the head 32a starts to rise out of fluid conducting engagement with the vessel 93.

While several embodiments of the present invention have been shown and described it will be understood that the apparatus for handling fluid described herein is capable of further modification and variation without departing from the principles of the invention and that the scope of the invention should be limited only by the scope and proper interpretation of the claims appended hereto.

The invention having thus been described, that which is claimed as new and is desired to be protected by Letters Patent is:

1. Apparatus for simultaneously conveying one fluid to a receiving vessel and another fluid from said vessel comprising upper and lower coaxially mounted riser pipes, said upper and lower pipes having respectively lower and upper ends in vertically spaced relation to each other, a swivel joint connected to each of said ends of said riser pipes, said swivel joints being vertically spaced from each other, a conduit connected to and extending laterally from each of said swivel joints, a swivel joint head assembly connected to the distal ends of said conduits, said head assembly being effective to maintain said conduits in substantially parallel relationship, a pair of tubes connected at their proximal ends to said swivel joint head assembly, each of said tubes being in flow communication with a respective one of said pair of conduits, said tubes having adjacent distal ends, and a coupling head connected to the distal ends of said tubes, said head being operable to discharge fluid from one of the tubes into said vessel and simultaneously to recover fluid from the vessel and convey the recovered fluid to the other tube.

2. Apparatus for simultaneously conveying fluid to a vessel and conveying fluid from the vessel comprising a pair of upstanding coaxial riser pipes having spaced confronting ends, vertically spaced swivel joints connected to said ends of the riser pipes, a conduit connected to and extending laterally from each of said swivel joints, a swivel joint head assembly connected to the distal ends of said conduits, said head assembly being effective to maintain said conduits in a certain relationship to each other, a pair of tubes connected at their proximal ends to said swivel joint head assembly and respectively in flow communication with said conduits, a swivel joint on the distal end of each of said tubes, and means connected to the swivel joints at the ends of the tubes for providing independent flow communication with said vessel.

3. Apparatus for simultaneously handling two separate fluids comprising an inboard boom section supported for swinging movement about a vertical axis, said inboard section comprising a pair of tubes, a swivel joint head assembly connected to and supported by the distal ends of said tubes, an outboard boom section connected to said swivel joint head assembly, said outboard boom section comprising a pair of tubes in flow communication through said swivel joint head assembly with the respective tubes of said inboard boom section, said outboard boom section being mounted on and supported by said swivel joint head assembly for universal pivotal movement of the outboard section with respect to said inboard section, fluid conduction means connected for pivotal movement to the distal ends of the tubes of said outboard boom section, and power means pivotally connected between said swivel joint head assembly and said outboard boom section for moving the outboard boom section to a selected position with relation to the inboard boom section.

4. Apparatus for conducting liquid from a source to a receiving vessel and for returning displaced vapor from said vessel to the source comprising a vertical liquid supply riser pipe connected to the source of liquid, a first tube swivelly connected to said supply riser pipe for movement in a horizontal plane, a swivel joint head assembly connected to the distal end of said first tube, a second tube in fluid communication with said first tube through said head assembly, said second tube being swivelly connected to said head assembly, a drop pipe swivelly connected to the distal end of said second tube for discharging liquid conveyed through said first and second tubes from the source, a vapor recovery hood connected to said drop pipe for recovering vapor from the receiving vessel, a vapor receiving riser pipe coaxial with said supply riser pipe, a third tube substantially parallel to and spaced apart from said first tube, said third tube being swivelly connected to said receiving riser pipe for movement in a horizontal plane and connected at its distal end to said head assembly, a fourth tube substantially parallel to and spaced apart from said second tube, said fourth tube being in fluid communication with said third tube through said head assembly, said fourth tube being swivelly connected to said head assembly and connected at its distal end to said vapor recovery hood, and means connected to said receiving riser pipe for conveying vapor from said third tube to said source.

5. Apparatus for moving liquid from a source to a receiving vessel and for recovering vapor from the vessel comprising a vertical liquid supply riser pipe connected to the source of liquid, a first tube swivelly connected to said supply riser pipe for movement in a horizontal plane, a swivel joint head assembly connected to the distal end of said first tube, a second tube in fluid communication with said first tube through said head assembly and swivelly connected at its proximal end to said head assembly, a drop pipe swivelly connected to the distal end of said second tube for discharging liquid conveyed through said first and second tubes into the receiving vessel, a vapor recovery hood connected to said drop pipe for recovering vapor from the receiving vessel, a third tube substantially parallel to and spaced apart from said second tube, said third tube being swivelly connected to said swivel joint head assembly and swivelly connected to said vapor recovery hood in flow communication therewith, a fourth tube substantially parallel to and spaced apart from said first tube and connected to said head assembly in flow communication with said third tube, a vapor receiving riser pipe coaxial with said supply riser pipe, and a swivel joint swivelly connecting said fourth tube to said receiving riser pipe.

6. The combination according to claim 5 having means connected to said swivel joint head assembly for moving the second and third tubes to a particular position with respect to said first and fourth tubes.

7. In a fluid delivering and vapor recovering apparatus, a coupling head comprising a drop pipe adapted to extend into a receiving vessel, a vapor recovery hood surrounding said drop pipe, means defining an inlet opening leading from the receiving vessel into the vapor recovery hood, a valve mounted on the last mentioned means normally closing said inlet opening, and means operable in response to placement of said coupling head in contact with the receiving vessel to open said valve in the inlet opening of said vapor recovery hood.

8. Apparatus for conveying fluid from a source vessel to a receiving vessel comprising an inboard boom section, an outboard boom section, a swivel assembly connected between said boom sections for mounting said outboard boom section for movement with respect to said inboard boom section, a fluid discharge means mounted on the distal end of said outboard boom section, means connected to said outboard boom section for moving said outboard boom section to a particular position with relation to the inboard boom section, a valve controlling fluid flow through said boom sections, power means for operating said valve, control means for said power means, and means disabling and enabling said moving means for the outboard boom section in response to operation of said control means.

9. Apparatus for conveying fluid from a source vessel to a receiving vessel comprising an inboard boom section, an outboard boom section, a swivel assembly connected between said boom sections and mounting said outboard boom section for pivotal movement with respect to said inboard boom section, a fluid discharge means mounted on the distal end of said outboard boom section, a pneumatic power cylinder connected to said outboard boom section for moving said outboard boom section relatively to said inboard boom section, a manually operated control valve for said power cylinder, a fluid flow control valve in said outboard boom section, a pneumatic operating cylinder for opening and closing said flow valve, a manually operated control valve for controlling said operating cylinder, and means operable in response to operation of said control valve for the operating cylinder for enabling operation of said power cylinder by said power cylinder control valve.

10. Apparatus for conveying fluid from a source vessel to a receiving vessel comprising an inboard boom section, an outboard boom section, a swivel assembly connected between said boom sections for mounting said outboard boom section for movement with respect to said inboard boom section, a fluid discharge means mounted on said outboard boom section, means connected to said outboard boom section for moving said outboard boom section to and from a particular position with relation to the inboard boom section, a fluid flow control valve in said outboard boom section, and means operable in response to movement of said outboard boom section from said particular position for closing said fluid flow control valve.

11. Apparatus for conveying liquid from a source vessel to a receiving vessel comprising an inboard boom section, an outboard boom section, a swivel assembly connected between said boom sections and mounting said outboard boom section for movement with respect to said inboard boom section, a liquid discharge means mounted on the distal end of said outboard boom section, means connected to said outboard boom section for moving said outboard boom section with relation to the inboard boom section, a liquid flow control valve in said outboard boom section, means operable in response to movement of said outboard boom section to a preselected position with relation to the receiving vessel for opening said flow control valve, and means operable in response to the attainment of a preselected liquid level in the receiving vessel for closing said flow control valve.

12. Apparatus for loading a volatile fluid into a receiving vessel and recovering vapor from the vessel, comprising an inboard boom section mounted for pivotal movement about a vertical axis, an outboard boom section mounted for universal movement on the distal end of said inboard boom section, each of said boom sections including a fluid conveying conduit, said conduits being in flow communication with each other, each of said boom sections including a vapor recovery conduit, said vapor recovery conduits being in flow communication with each other, means connected to said outboard boom section for pivotally moving said outboard boom section about a horizontal axis, a flow control valve in the fluid conduit of said outboard boom section, a movable float member adjacent the distal end of said outboard boom section, and means operable in response to movement of said float member for closing said product flow valve.

13. Apparatus for conveying fluid from a source vessel to a receiving vessel comprising an inboard boom section, an outboard boom section, a swivel assembly pivotally mounting said outboard boom section on said inboard boom section, a fluid discharge means mounted on the distal end of said outboard boom section, power means connected to said outboard boom section for moving said outboard boom section with respect to the inboard boom section, a fluid flow control valve in said outboard boom section, a movable float member located adjacent said discharge means, and means operable in response to movement of said float member for actuating said power means to move said outboard boom section.

14. Apparatus for loading volatile fluids and recovering the vapor, comprising an inboard boom section mounted for pivotal movement about a vertical axis, an outboard boom section mounted for pivotal movement on said inboard boom section, each of said boom sections including a fluid conveying conduit and a vapor recovery conduit, said fluid conveying conduits being in flow communication with each other, said vapor recovery conduits being in flow communication with each other, power means connected to said outboard boom section for pivotally moving said outboard boom section relatively to the inboard boom section, a movable float member carried by said outboard boom section, and means operable in response to movement of said float member for actuating said power means to raise said outboard boom section.

15. Apparatus for conveying fluid from a source vessel to a receiving vessel comprising an inboard boom section, an outboard boom section, a swivel assembly connected between said boom sections for mounting said outboard boom section for movement with respect to said inboard boom section, fluid discharge means mounted on the distal end of said outboard boom section, means connected to said outboard boom section for moving said outboard boom section relatively to the inboard boom section, a fluid flow control valve in said outboard boom section, a movable float member adjacent said discharge means, means operable in response to movement of said float member for actuating said outboard boom section moving means to raise the outboard boom section, and means automatically operable in response to raising said outboard boom section for closing said fluid flow valve.

16. Apparatus for conveying fluid from a source vessel to a receiving vessel comprising an inboard boom section, an outboard boom section, a swivel assembly connected between said boom sections and mounting said outboard boom section on the inboard boom section for movement with respect thereto, means connected to said outboard boom section for moving the same relatively to the inboard boom section, a fluid flow control valve in one of said boom sections, fluid discharge means mounted on said outboard boom section, a movable float member adjacent said discharge means, means operable in response to raising of said float member for actuating said moving means for the outboard boom section, and means operable in response to raising said float member for closing said fluid flow valve.

17. In a fluid handling apparatus, rigid upper and lower inboard tubes having inner and outer ends; means mounting the inner end of said inboard tubes for horizontal swinging movement of said tubes about a first upstanding axis; upper and lower outer swivel joints individually connected to the outer ends of said inboard tubes; rigid outboard tubes having inner and outer ends; inner swivel joints individually connected to the inner ends of said outboard tubes; means interconnecting all of said swivel joints so that said outer joints are coaxial with each other, said inner joints are coaxial with each other, the axis of the outer joints is substantially parallel to said upstanding axis, the axis of said inner joints intersects said axis of the outer joints, and so that each outboard tube is in fluid communication with a respective one of said inboard tubes; and means interconnecting the outer ends of the outboard tubes and providing flow passages individually communicating with said outboard tubes.

18. In a fluid handling apparatus, a support; vertically spaced upper and lower inner swivel joints mounted on said support so that they have a common first upstanding axis of rotation; rigid upper and lower inboard tubes having inner ends individually connected to said upper and lower swivel joints for horizontal swinging movement of said inboard tubes about said first axis, said inboard tubes also having outer ends; upper and lower outer swivel joints respectively connected to the outer ends of said inboard tubes; rigid outboard tubes having inner and outer ends; lateral outer swivel joints individually connected to the inner ends of said outboard tubes; means interconnecting all of said outer swivel joints so that said upper and lower outer joints have a common second upstanding axis of rotation substantially parallel to said first axis, so that said lateral outer joints have a common third axis of rotation transverse to said second axis, and so that the outer ends of said inboard tubes are individually in fluid communication with the inner ends of respective outboard tubes, said interconnecting means mounting said outboard tubes for swinging movement about said second and third axes; and fluid conducting means interconnecting the outer ends of the outboard tubes.

19. In a fluid handling apparatus, inboard and outboard pairs of rigid tubes, each tube having inner and outer ends; means mounting the inner ends of the inboard tubes for swinging movement about a predetermined first axis; means interconnecting the outer ends of the outboard tubes and providing flow passages individually communicating with said outboard tubes; and means connecting the outer ends of the inboard tubes to the inner ends of the outboard tubes so that said inboard tubes and said predetermined first axis are in a common first plane, so that said outboard tubes are in a common second plane intersecting said first plane, so that said outboard tubes are swingable about a second axis substantially parallel to said predetermined first axis and about a third axis disposed transversely of said second axis, said second and third axes being respectively in said first and second planes, and so that each outboard tube is in fluid communication with a respective one of the inboard tubes.

20. The apparatus of claim 19 including means connected to said outboard tubes for controlling the swinging movement thereof about said third axis.

21. The apparatus of claim 20 wherein said controlling means is supported between and on said outboard tubes and is attached to said connecting means.

22. The apparatus of claim 19 wherein said interconnecting means is swingable with respect to said outboard tube about a fourth axis substantially parallel to said third axis.

23. The apparatus of claim 18 wherein said fluid conducting means includes swivel joints individually connected to the outer ends of the outboard tubes and a coupling head connected to the outboard tubes by said latter swivel joints for swinging movement about a fourth axis substantially parallel to said third axis, said head providing fluid passageways individually communicating with said outboard tubes.

24. In a fluid handling apparatus including a pivotally mounted tubular boom, a coupling head on the free end of the boom for fluid communication with a receiving vessel, means for supplying liquid to said boom to be conveyed thereby to said receiving vessel, a flow control valve in the boom through which liquid flows from said supplying means to said vessel, and a boom cylinder for raising and lowering the boom, the combination of a cylinder control valve having a first position connecting a fluid pressure conduit through a second conduit to one end of the bloom cylinder to lower the boom and the coupling head into fluid communicating relation with said vessel, and a second position connecting said pressure conduit to said boom cylinder to raise said boom and head out of said fluid communicating relation; a fluid actuated device including means which enables the flow control valve to be opened following actuation of said device; and means for connecting the cylinder control valve to the fluid actuated device so that the fluid actuated device is actuated only when the cylinder control valve is in said first position whereby fluid pressure from said pressure conduit for opening said flow control valve is not available until said coupling head is lowered.

25. Fluid handling apparatus according to claim 24, wherein the fluid actuated device is directly connected to the flow control valve by a lever whereby the valve is opened when fluid pressure actuates said device and is closed when the fluid pressure is relieved from said device.

26. Fluid handling apparatus according to claim 24 wherein said fluid actuated device is a cylinder directly connected to said valve and wherein a compression spring in the cylinder yieldably urges the valve into its closed position.

27. Fluid handling apparatus according to claim 24 wherein the means for connecting the cylinder control valve to the fluid actuated device includes a manually operated control valve connected to said fluid actuated device for selectively precluding and allowing application of fluid pressure to said fluid pressure device from said pressure conduit and relieving the fluid pressure from said device.

28. Fluid handling apparatus according to claim 24 wherein a manually operated venting valve is connected to the fluid actuated device for manually relieving fluid pressure from said device.

29. Fluid handling apparatus according to claim 24 wherein a check valve control device is connected in said second conduit, and a control cylinder interconnecting the check valve control device and said fluid actuated device so that fluid pressure is simultaneously applied to the fluid actuated device and to the control cylinder thereby positioning a check valve of the check valve control device in said second conduit whereby the boom cannot be raised by the boom cylinder until fluid pressure is relieved from the fluid actuated device.

30. Fluid handling apparatus according to claim 29 wherein said check valve control device includes a compression spring yieldably urging said check valve out of said second conduit and a through passage into alignment with said second conduit.

31. Fluid handling apparatus according to claim 24 wherein a venting unit is connected to the fluid actuated device and is controlled by a float for relieving fluid pressure from said device when said float rises a predetermined distance.

32. Fluid handling apparatus according to claim 24 wherein a venting unit is mounted on said coupling head and is connected to said fluid actuated device for precluding application of fluid pressure to said device unless said head is in fluid communicating relation with said vessel.

33. Apparatus for conveying fluids between a pair of vessels one of which is on a vehicle comprising a support stationary with respect to one of the vessels, upper and lower swivel joints mounted on said support in vertically spaced, coaxial relation to each other, upper and lower rigid tubes having inner ends individually connected to said upper and lower swivel joints and opposite outer ends, said tubes projecting outward from said swivel joints in vertically spaced relation to each other, and fluid conducting means interconnecting the outer ends of said tubes for establishing fluid communication with the other vessel the vertical load at the outer ends of said tubes being imposed on said swivel joints through said tubes whereby the thrust of said load is directed against said lower swivel joint toward said support and against said upper swivel joint away from said support.

34. In a fluid handling apparatus, a support, upper and lower swivel joints mounted on the support in a vertically spaced relation and so that they provide a common upstanding axis of rotation, inboard and outboard pairs of rigid tubes, each tube having inner and outer ends; means mounting the inner ends of said inboard tubes individually on said upper and lower swivel joints for swinging movement of said inboard tubes about said upstanding axis; fluid delivering means interconnecting the outer ends of the outboard tubes and providing flow passages individually communicating with said outboard tubes and with outlet ports opening outward of said delivering means; a coupling member having a pair of flow passages therein, one of said passages having a lateral port and a lower port and the other of said passages having a lateral port and an upper port; swivel joints individually connecting the upper and lower ports of said coupling member to the outer end of said inboard tubes; swivel joints individually connecting the lateral ports of said coupling member to the inner ends of said outboard tubes, said inboard tubes being thereby vertically spaced from each other in a common vertical plane and said outboard tubes being horizontally spaced from each other; and means for raising and lowering said outboard tubes with respect to said coupling member.

35. Apparatus for simultaneously conveying two fluids comprising a support, upper and lower swivel joints mounted on said support in vertically spaced, coaxial relation to each other, upper and lower rigid tubes having inner ends individually connected to said upper and lower swivel joints and opposite outer ends, said tubes projecting outward from said swivel joints in vertically spaced relation to each other, fluid conducting means interconnecting the outer ends of said tubes, the vertical load at the outer ends of said tubes being imposed on said swivel joints through said tubes whereby the thrust of said load is directed against said lower swivel joint toward said support and against said upper swivel joint away from said support, said fluid conducting means including a pair of outer tubes in flow communication with respective upper and lower tubes, said fluid conducting means supporting said outer tubes for elevational movement with respect to said upper and lower tubes, and means connected to said outer tubes for elevationally moving the same.

References Cited by the Examiner

UNITED STATES PATENTS

| 1,290,869 | 1/19 | Austin | 285—134 |
| 1,988,003 | 1/35 | Ford | 285—30 |
| 2,303,949 | 12/42 | Nordell | 138—39 |
| 2,439,887 | 4/48 | Elliot | 141—290 |
| 2,590,797 | 3/52 | Siciliano | 138—39 |
| 2,768,842 | 10/56 | McDermott | 285—136 |
| 2,803,269 | 8/57 | Switzer | 141—250 |
| 2,919,834 | 1/60 | Rugeley et al. | 222—318 XR |

FOREIGN PATENTS 206,404  6/08  Germany.

LAVERNE D. GEIGER, *Primary Examiner.*
LOUIS J. DEMBO, *Examiner.*